United States Patent Office 2,804,374
Patented Aug. 27, 1957

2,804,374

TITANIUM DIOXIDE PIGMENTS FOR BAKING ENAMELS

Guy C. Marcot, Lynchburg, and John P. Wikswo, Amherst, Va., assignors to American Cyanamid Company, New York, N. Y., a corporation of Maine No Drawing. Application October 4, 1951,
Serial No. 249,806

6 Claims. (Cl. 23—202)

This invention relates to the preparation of titanium dioxide pigments. More particularly, this invention relates to a novel process for the production of titanium dioxide pigments wherein a washed titania hydrolysate is partially dried by evaporation of water therefrom the dried hydrolysate is densified, and the densified hydrolysate is calcined and finished to yield improved titanium dioxide pigments. These pigments are characterized in that baking enamels pigmented therewith exhibit improved gloss and color when baked.

At the present time, titanium dioxide pigments are prepared by calcination of a treated, washed titanium sulfate hydrolysate. The calcination product, when subjected to an intensive grinding, a hydroclassification, and other conventional finishing treatments, constitutes the titanium dioxide pigment of commerce. One typical means for the preparation of this hydrolysate is the hydrolysis, under carefully controlled conditions, of a titanium sulfate solution containing iron, prepared by digesting a titanium-bearing ore with sulfuric acid, followed by reduction of all ferric iron to ferrous iron, removal of a part of the iron by crystallization as ferrous sulfate, and clarification of the liquor and adjustment of its density. The white material which precipitates as the result of this hydrolysis has not been exactly defined, but it is believed that its composition is best described by the formula

$$10TiO_2 \cdot 10H_2O \cdot xSO_3$$

and corresponds to the materials disclosed in U. S. Reissue Patents 16,956, 18,790 and 18,854, and in U. S. Patent 1,851,487. In every instance, the hydrolysate is thoroughly washed with water to remove absorbed salts and is finally sucked as dry as possible on a filter. The calcined titanium dioxide pigment produced by this process is the premier pigment for organic baking enamels where high opacity, durability, gloss and brilliant whiteness are desired in combination.

At the present time, the white enamels which are applied to the finishing of kitchen, medical and sanitary equipment are baked so as to form a coating approximating, as nearly as possible, the hardness of fused, vitreous enamel. The use of modern blends of alkyd resins with urea and melamine resins has created baked coatings which are almost porcelain-like in their whiteness and durability. It is a known disadvantage that during the baking step, the $TiO_2$ either itself causes the surface of the film to dull and to darken, or assists these changes to take place. This activity is most detrimental and a demand has arisen for a titanium dioxide pigment inert in these respects.

The surprising discovery has been made that the tendency of $TiO_2$ to cause these finishes to dull and to darken on baking can be markedly reduced by the introduction of two simple steps in the conversion of titania hydrolysate into $TiO_2$ pigment. Briefly, the washed titania hydrolysate, referred to above, is partially dried, as hereinafter set forth. In the second step, the resulting porous and friable mass is densified by kneading until these voids are eliminated. The compact and semi-pasty mass thereby obtained is then calcined and processed to titanium dioxide pigment in the normal fashion as an equivalent for the washed titania hydrolysate currently employed. When incorporated in baking enamels of the above-described types, the pigments produced according to the present invention make a significant reduction in the degree of dulling and darkening which the film undergoes on baking.

The process of the present invention has two other distinct advantages. In the first place, it causes the densified hydrolysate, when containing rutile seed, to convert to rutile titanium dioxide at a lower temperature and in a shorter time than when the densification step has been omitted. In the second place, it markedly decreases the absorptive capacity of the pigment for oil.

More in detail, according to the present invention, washed filtered titania hydrolysate is dried until the hydrolysate has become a solid self-sustaining mass containing minute voids. Ordinarily, these voids begin to form when the solids content of the filtered hydrolysate has increased by about 5% (calcined $TiO_2$ basis). The amount of water removed by the drying may be much more, and a material having a solids content of as much as 52%, may be employed. This represents an extensive removal of water, the filtered hydrolysate having a solids content of 38%. It is not advisable to carry the drying much further than 52%. Preferably, this limit is not approached, and the hydrolysate is dried until its solids content is only in the range of about 44% to 48%. In this range, the hydrolysate is a porous, soft and friable cake, containing an immense number of minute voids formed by evaporation of the water.

Still according to the present invention, the dried hydrolysate is densified until all, or substantially all, of the voids have been reduced. When the hydrolysate has been dried to the preferred range, this may be performed by a gentle kneading, or equivalent mechanical action, designed only to eliminate these voids. A compact, putty-like or plastic mass is very readily produced. Best results are attained when the kneading is continued until the apparent density of the dried hydrolysate ceases to increase. Little change takes place after the first few minutes of kneading. When the solids content of the hydrolysate is allowed to increase beyond the preferred range, the effort required to form a plastic mass increases sharply.

Hydrolysates which have solids contents of more than about 52% (calcined $TiO_2$ basis) are so difficult to work that they are of little practical use and so outside the scope of the invention.

It will be understood that the washed titania hydrolysate referred to above may, and preferably will, contain the conventional conditioning and mineralizing agents known to the art. For example, the hydrolysate may contain 1 or 2% of zinc oxide and potassium carbonate. In addition, the hydrolysate may, if desired, contain an effective amount of rutile seed to cause the pigment to form in the rutile crystal modification. The plastic densified hydrolysates are calcined normally between about 850° C. and about 1000° C. until the derived pigmentary properties are obtained, as is well known to men skilled in the art. The addition of conditioning agents, mineralizing agents and rutile seed are broadly conventional, and these treatments, together with the type of calcination employed, forms no part of the present invention.

The method of performing the kneading or densification described above is not at all critical. Surprisingly, this may be readily performed by hand mulling the dried hydrolysate in an ordinary mortar and pestle for as little as five minutes. On a larger scale, mechanical equipment may be used, such as a roll mill set to simulate hand kneading, a Banbury mixer, or a Werner-Pfleiderer mixer.

The following examples are given solely to illustrate preferred embodiments of this invention and are not to be regarded as a limitation thereof. The invention itself has been set forth above.

Examples 1–7

A quantity of titania hydrolysate was taken from the current production of a plant wherein an ilmenite ore concentrate is reacted with sulfuric acid to form a titanium sulfate solution containing ferrous sulfate, a portion of the ferrous sulfate is removed by crystallization, the solution is clarified and concentrated, the titanium sulfate is thermally hydrolyzed to titania hydrolysate which precipitates, the mother liquor is removed and the titania hydrolysate is slurried with water and washed and sucked as dry as possible on a leaf-type vacuum filter. This hydrolysate contained 38% solids ($TiO_2$ basis, as determined by calcining the material at 1000° C. for one hour). This hydrolysate was then blended with 0.4% $K_2CO_3$, 0.02% MgO and 2.25% rutile seed, all on a $TiO_2$ basis. The seed corresponded to Example 1 of Tanner et al., U. S. Patent 2,427,165. 200 g. of this treated filter cake containing the equivalent of 760 g. of $TiO_2$ was placed in a tarred evaporating dish and 270 g. of water were removed by evaporation in a drying oven at 150° C. to yield a partially dried and porous and friable cake containing 44% solids ($TiO_2$ basis). The same procedure was followed to yield cakes having solids content of 42%, 46%, 48%, 50% and 52%, respectively. Each of these samples was transferred to a large mortar and kneaded by hand with a pestle until each had been worked into a compact, dense and semi-plastic mass. In each instance, working was continued until maximum plasticity was reached. Putty-like masses were obtained in a few minutes from the first four samples. The last two samples containing the least water required several minutes longer and the products were firmer. The products were calcined to rutile at 975° C. for 1.5 hours, together with a sample of the control hydrolysate and the resulting $TiO_2$ samples ground and finished in accordance with the method illustrated in Example 1 of U. S. Patent 2,284,772. The samples were evaluated in comparison with the control pigment. The results thus obtained were as follows:

| Properties | Example Nos. | | | | | | |
|---|---|---|---|---|---|---|---|
| | 1 (Control) | 2 | 3 | 4 | 5 | 6 | 7 |
| | (Initial) | After Drying and Before Densification | | | | | |
| Percent Solids | 38.0 | 42.0 | 44.0 | 46.0 | 48.0 | 50.0 | 52.0 |
| UPON DISCHARGE FROM CALCINER | | | | | | | |
| Apparent density | 0.84 | 0.89 | 0.96 | 1.03 | 1.02 | 1.10 | 1.05 |
| FINISHED TITANIUM DIOXIDE PIGMENT | | | | | | | |
| Oil absorption [1] | 25.6 | 23.7 | 22.6 | 21.2 | 21.3 | 20.6 | 21.2 |
| ON COMPLETION OF BAKED LACQUER TEST | | | | | | | |
| Gloss [2] | | +5 | +6 | +6 | +6 | +5 | +5 |
| Color [2] | | +5 | +6 | +5 | +5 | +4 | +4 |

[1] Gms. oil absorbed per 100 gm. of $TiO_2$.
[2] Increments of improvement over control.

The apparent density values were obtained by determining the weight in grams of one cubic centimeter of particles of the material in the +10–8 mesh range.

The oil absorption values were determined by incorporating white refined linseed oil with a weighed quantity of pigment. The oil was added drop by drop and the test was complete when exactly enough oil was added to produce a very stiff paste which could be picked up with a spatula without falling off, the time of this determination being made approximately seven minutes after the beginning of the test. Results are reported as grams of oil absorbed per 100 grams of pigment. The oil absorption value of the product of Example 1 met commercial standards.

Samples for the gloss and color retention tests were made by preparing lacquers from Glyptal 2462, a substantially colorless phthalic drying oil-modified transparent alkyd resin, and each of the pigments in the ratio 3.5 cc. of resin to 5.0 g. of pigment. The resin is described on page 65 of circular 738 of the National Paint, Varnish & Lacquer Association Science Section. The materials were mulled thoroughly, thinned, and mulled still further, until a homogeneous paste had been obtained. Each of the enamels was pulled down at 0.005" film thickness on a tin panel and baked for 1 hour at 350° F. After removal from the oven, the enamels containing the pigments of the present invention were whiter and glossier than the enamel containing the control pigment. These improvements were expressed numerically by determining the units of discernible differences by which each of the samples differed from the control; thus, the gloss of the baked enamel of Example 5 was found to be superior to the gloss of the control by six discernible degrees of glass; and, similarly, was found to be superior in color to the control by five discernible degrees of color.

The greatest improvement in oil absorption was found in the case of the pigment of Example 6, which absorbed about 19.5% less oil than the control.

Example 8

A sample of a washed titania hydrolysate containing 0.34% of $K_2CO_3$, 0.02% MgO and 2.5% of the preformed rutile seed of the Tanner et al. patent was withdrawn from the current production of $TiO_2$ by the sulfate process, and was very similar to that used in the tests above. This hydrolysate had been sucked as dry as possible on a vacuum leaf filter and similarly contained 38.0% solids ($TiO_2$ basis). The sample was air-dried at 200° C. to a solids content of 46% and a part was hand mulled for five minutes in a mortar until the material had become semi-pasty. Both portions were then calcined at 950° C. for 3 hours. On cooling, the samples were examined by X-ray diffraction means. It was found that the $TiO_2$ formed from the control contained 75.5% rutile, whereas the $TiO_2$ formed from the sample which had been densified contained 93% rutile.

We claim:

1. In a process for the production of titanium dioxide pigment by calcination of a water-washed titania hydrolysate, the steps of evaporating water from a water-washed titania hydrolysate sufficiently to form voids in said hydrolysate and insufficiently to increase the solids content of said hydrolysate to more than about 52% (calcined $TiO_2$ basis), and densifying the thus-dried hydrolysate until said voids are substantially filled.

2. Process according to claim 1 wherein the solids content of the hydrolysate is increased to about 44–48%.

3. In a process for the production of improved titanium dioxide pigment by calcination of a water-washed titania hydrolysate, the steps of evaporating water from a water-washed titania hydrolysate sufficiently to increase the solids content of said hydrolysate by at least 5% (calcined $TiO_2$ basis) and insufficiently to increase the solids content of said hydrolysate to more than about 52%, and kneading the thus-dried hydrolysate until the apparent density of said hydrolysate has become substantially constant.

4. Process according to claim 3 wherein the solids content of the hydrolysate is increased to about 44–48%.

5. In a process for the production of improved titanium dioxide pigment by calcination of a water-washed titania hydrolysate, the steps of evaporating water from a water-washed titania hydrolysate sufficiently to increase the solids content of said hydrolysate by at least 5% (calcined $TiO_2$ basis) and insufficiently to increase the solids content of said hydrolysate to more than about 52%, and compacting the thus-dried hydrolysate until a dense and semi-plastic mass is obtained.

6. Process according to claim 5 wherein the solids content of the hydrolysate is increased to about 44–48%.

References Cited in the file of this patent

UNITED STATES PATENTS

| | | |
|---|---|---|
| 1,851,487 | Blumenfeld | Mar. 29, 1932 |
| 2,342,483 | Olson | Feb. 22, 1944 |
| 2,427,165 | Tanner | Sept. 9, 1947 |
| 2,439,895 | Keats et al. | Apr. 20, 1948 |
| 2,480,092 | Whately | Aug. 23, 1949 |

OTHER REFERENCES

"Titanium" by Jelke Barksdale, 1949 ed., page 251. The Ronald Press Co., N. Y.

UNITED STATES PATENT OFFICE

CERTIFICATE OF CORRECTION

Patent No. 2,804,374                                              August 27, 1957

Guy C. Marcot et al.

It is hereby certified that error appears in the printed specification of the above numbered patent requiring correction and that the said Letters Patent should read as corrected below.

Column 3, line 26, for "200" read -- 2000 --; column 4, line 31, for "glass" read -- gloss --.

Signed and sealed this 22nd day of October 1957.

(SEAL)
Attest:

KARL H. AXLINE
Attesting Officer

ROBERT C. WATSON
Commissioner of Patents